Feb. 13, 1945. W. C. WEBER 2,369,194
SEDIMENTATION APPARATUS
Filed Jan. 1, 1943 7 Sheets-Sheet 4

INVENTOR
WILLIAM C. WEBER
BY
ATTORNEY

INVENTOR
WILLIAM C. WEBER
BY
ATTORNEY

Patented Feb. 13, 1945

2,369,194

UNITED STATES PATENT OFFICE 2,369,194

SEDIMENTATION APPARATUS

William C. Weber, Westport, Conn., assignor to The Dorr Company, New York, N. Y., a corporation of Delaware Application January 1, 1943, Serial No. 470,985

20 Claims. (Cl. 210—55)

This invention relates to sedimentation apparatus whereby solids suspended in or carried by a continuous supply of liquid are settled out on the bottom of a tank, and the settled solids are continually collected and removed from the tank by mechanical means, while effluent liquid relieved of the respective solids continually discharges from the tank.

The apparatus according to this invention may serve a variety of sedimentation apparatus, for example in the clarification of water where water purification treatment or softening is involved, or in the clarification of sewage or sewage liquids or trade wastes. Such clarification steps may be and often are performed in conjunction with a variety of treatment steps whereby suspended solids are conditioned for sedimentation. For instance, one such conditioning treatment step is known as flocculation. Another one, referring specifically to sewage, is aeration or activation and still others are biofiltration and digestion.

Another more specific example is the application of this invention in sedimentation apparatus that serves the removal from raw sewage of the initial or coarse impurities therein comprising largely gritty matter, which grit removal step is often combined with a grit cleaning step whereby organic and putrescible matter is washed off the grit and left in or returned to the sewage liquid that constitutes the effluent from this treatment step. In sewage treatment this grit removal step as such is distinguished from subsequent clarification steps in which lighter and less settleable solids, largely organics, are separated from the sewage by suitably controlled sedimentation, or by sedimentation in conjunction with preceding steps whereby suspended solids are conditioned for sedimentation.

One factor to consider in the design and layout of such sedimentation apparatus or tanks is the size of the settling area that should be available under certain flow conditions and in view of the character of the particular solids-bearing liquid that is being handled.

Another consideration is what will herein be called volumetric efficiency of the tank, or otherwise expressed, the degree of evenness or thoroughness with which the body of liquid in the tank is being displaced in all parts thereof by the incoming feed liquid. That is to say, an ideal volumetric efficiency would exist where the rate of liquid displacement is the same at any point of a flow cross-section of the tank.

Customary forms of settling tanks are either round or rectangular. The round type is provided with a rotary sediment raking mechanism by means of which the sediment or sludge on the bottom is conveyed either inwardly or outwardly to a point of withdrawal. The feed inlet is disposed at the center of the tank and the effluent withdrawal is largely by overflow all along the circular margin of the tank.

In the rectangular or longitudinal type of tank the feed inlet is at one end and the effluent discharge at the opposite end. The sediment-conveying mechanism may comprise either a reciprocating mechanism whereby sediment raking means operate back and forth between the ends of the tank, conveying sediment in one direction to discharge at one end of the tank, and idling back in the opposite direction, that is to the opposite end of the tank; or the mechanism may comprise some endless sludge-conveying means whereby the sediment is delivered continuously at one end of the tank for discharge.

The round type of settling tank may be said to be relatively cheaper in construction cost, mainly in view of the circular shape of the tank wall, as compared with the longitudinal type of tank. That is to say, the longitudinal tank costs more especially with respect to the construction of the concrete tank walls.

It is among the objects of this invention to produce a sedimentation tank of high volumetric efficiency, and of low construction cost as well. This object is obtained by providing in a round tank and adjacent each other a radially extending feed channel from which feed liquid is released laterally, and an equally radially extending receiving duct or channel for effecting the withdrawal of effluent. That is to say, the liquid flowing laterally from the radial feed channel follows a circular path parallel to the circular wall of the tank until it enters laterally into the effluent channel whereby it is withdrawn in a radial direction from the interior of the tank.

Another object is to improve the volumetric efficiency of settling tanks of the round as well as the rectangular type by improving the means and manner whereby effluent is admitted to and withdrawn from the tank. This object is obtained by admitting the feed liquid evenly over a considerable depth of the tank, and correspondingly withdrawing effluent evenly over a considerable depth of the tank. Therefore, the features relating to improvements of the feed inlet means and the effluent outlet means, while herein shown to be embodied in a circular tank, are not necessarily limited thereto but may be considered as improvements also of the longitudinal form of tank.

According to one feature the feed liquid is admitted evenly and effectively over a considerable depth, that is to say, over a considerable portion of the cross-sectional flow area of the tank. This depth may be represented by the length of vertical openings or vertical slots provided in the side of a relatively deep feed-admitting chamber or trough.

A more specific feature lies in the particular form of vertical feed-directing members or inlet vanes or baffles, which are so designed that clogging of the feed inlet slots with suspended coarse matter such as rags, is avoided. These members may be in the form of rotatably adjustable vertical vanes.

According to another feature the effluent is withdrawn through openings disposed below the water level. The area of the withdrawal openings, herein termed the effluent area, is so disposed and distributed that the withdrawal of effluent from the tank is effected substantially evenly over a considerable portion or depth of the cross-sectional flow area of the tank. For the purpose of this invention this manner of effluent withdrawal is herein to be called depth withdrawal and as such it may be distinguished from the withdrawal by way of overflow weir. However, it is herein also contemplated that depth withdrawal may be combined with overflow weir withdrawal in a suitable manner.

Where the invention is embodied in the round type of tank and in the manner herein illustrated, it will be understood that those component portions of the liquid flowing along some of the inner circular paths, travel a shorter distance from inlet to outlet than other portions flowing along paths of larger diameters. Therefore, according to this embodiment a portion of the effluent area that is relatively near the center of the tank is to be relatively smaller than the effluent area of a corresponding flow cross-section at a surrounding, that is to say, more outwardly disposed portion of the liquid body in the tank. In other words, according to this embodiment the effluent area increases in proportion to the distance of respective component portions of the liquid from the center of the tank. In this way the flow volume passing through a given cross-sectional flow area is kept in proportion to the length of the respective circular path along which it travels, and all portions of the liquid are thus given a relatively even chance as measured by the length of time provided for the solids carried by them to be deposited upon the tank bottom from where they are currently removed by a rotary raking mechanism to a point of discharge.

Specific features lie in the details of a unitary sector-like structure mounted in a round tank, and embodying a feed emitting and an effluent receiving channel, separated from each other by a partitional radially extending wall. Other features are embodied in structure whereby depth distribution of influent, and depth withdrawal of effluent, is attained.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which

Figure 1:
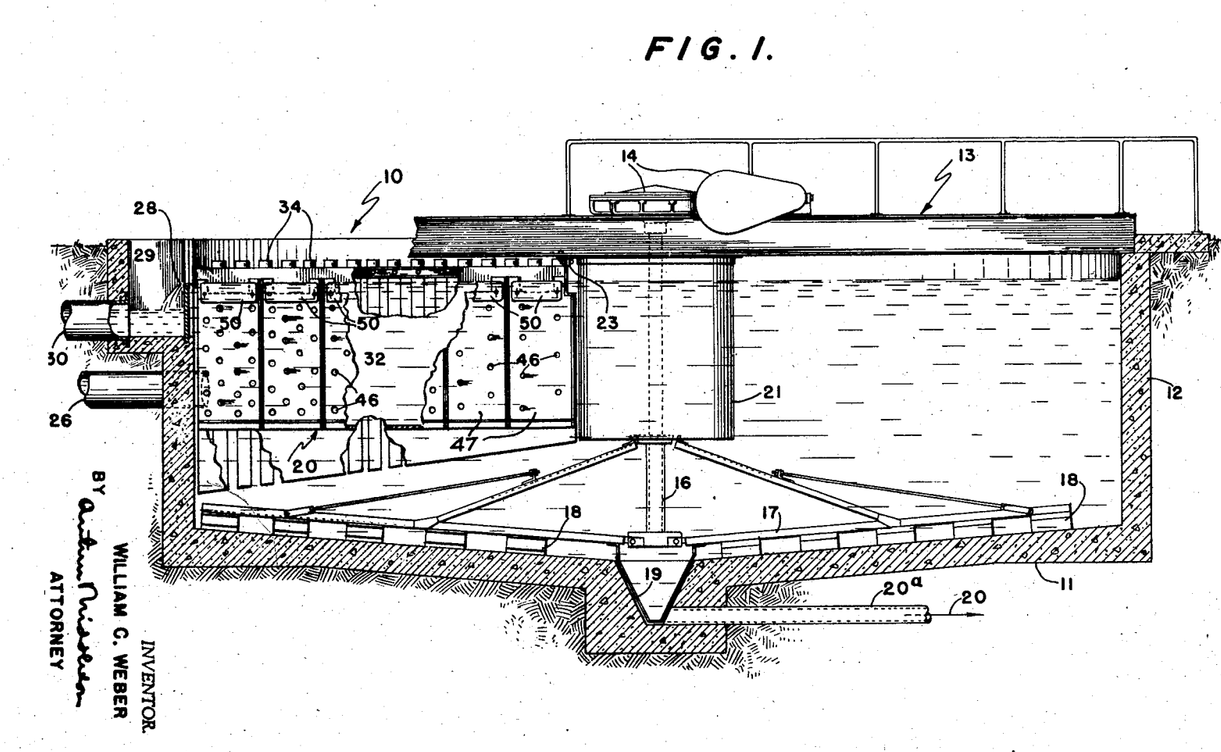
Figure 1 is the elevational section of a round settling tank embodying the invention.

A sedimentation tank embodying this invention is shown according to Fig. 1 to present the type that lends itself to the purpose of clarifying a continuous supply of liquid containing solids in suspension. This embodiment differs in some structural details from the construction herein proposed for the more specific purpose of the removal of heavier solids such as grit from liquids, and such more specialized purpose will be explained more fully below in conjunction with the embodiment shown in Figs. 9 and 10.

According to Fig. 1 the tank structure 10 proper comprises a bottom portion 11 and circular wall portion 12. Diametrically across the tank is placed a beam construction 13 comprising a pair of parallel beams 13$^a$ and 13$^b$ supported by the tank wall 12, which beam construction in turn serves to support a rotary raking mechanism which includes a drive mechanism 14 mounted and supported upon the beam construction 13, a central rotary shaft 16 supported from and driven by the drive mechanism, and rake arms 17 mounted on and supported by the lower end portion of the shaft 16 and provided with blade members 18 adapted when the shaft 16 rotates to convey sediment from the outlying zones of the tank bottom towards and into a central sediment outlet 19 whence it may be withdrawn as indicated by arrow 20 through outlet pipe 20$^a$.

A central stationary circular baffle 21 is shown to be supported from the under side of the beam construction 13, and the function of that circular baffle in this instance is merely to isolate the dead volume in its interior that would be relatively ineffective for the purpose of sedimentation as practiced according to this invention.

The novel means for feeding liquid to and withdrawing effluent from the tank are shown in this embodiment to comprise a unitary sector-like structure 22 (see Figs. 1 and 2) the inner and narrower end of which is supported as at 23 from the beam construction 13, while the outer and wide end portion is shown to be fastened to the tank wall portion as at 24. This unitary structure 22 which, is substantially of sector shape or triangular shape in plan, comprises a feed channel or section or chamber 25 having at the outer or wide end thereof a feed inlet connection 26, and it comprises an effluent receiving channel or section 27 having at the outer end thereof an overflow weir 28 over which clarified effluent discharges into a receiving chamber 29 whence it is passed away through an effluent discharge pipe 30.

Figure 2:
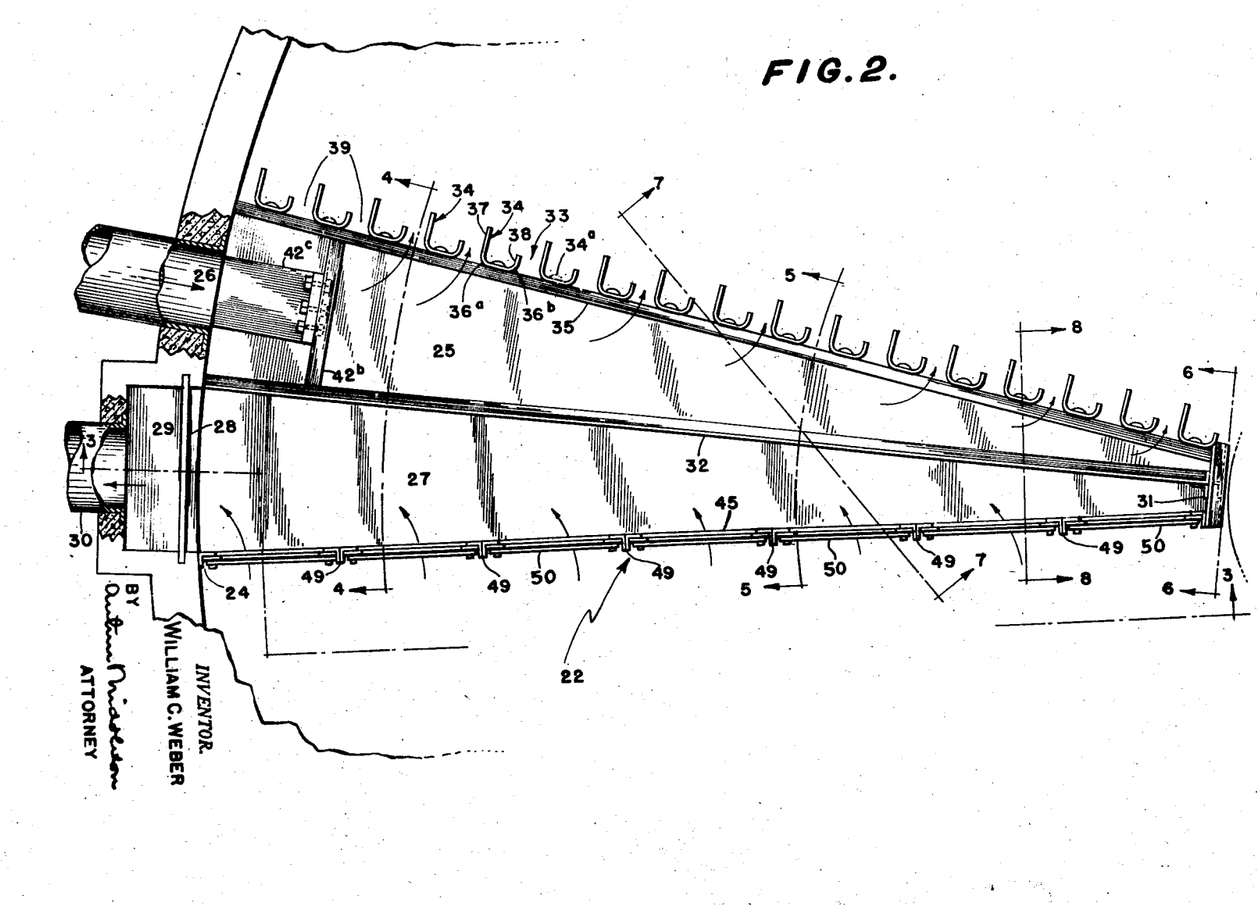
Fig. 2 is an enlarged detail plan view of the feed inlet and effluent outlet means shown in Fig. 1.
Figure 3:
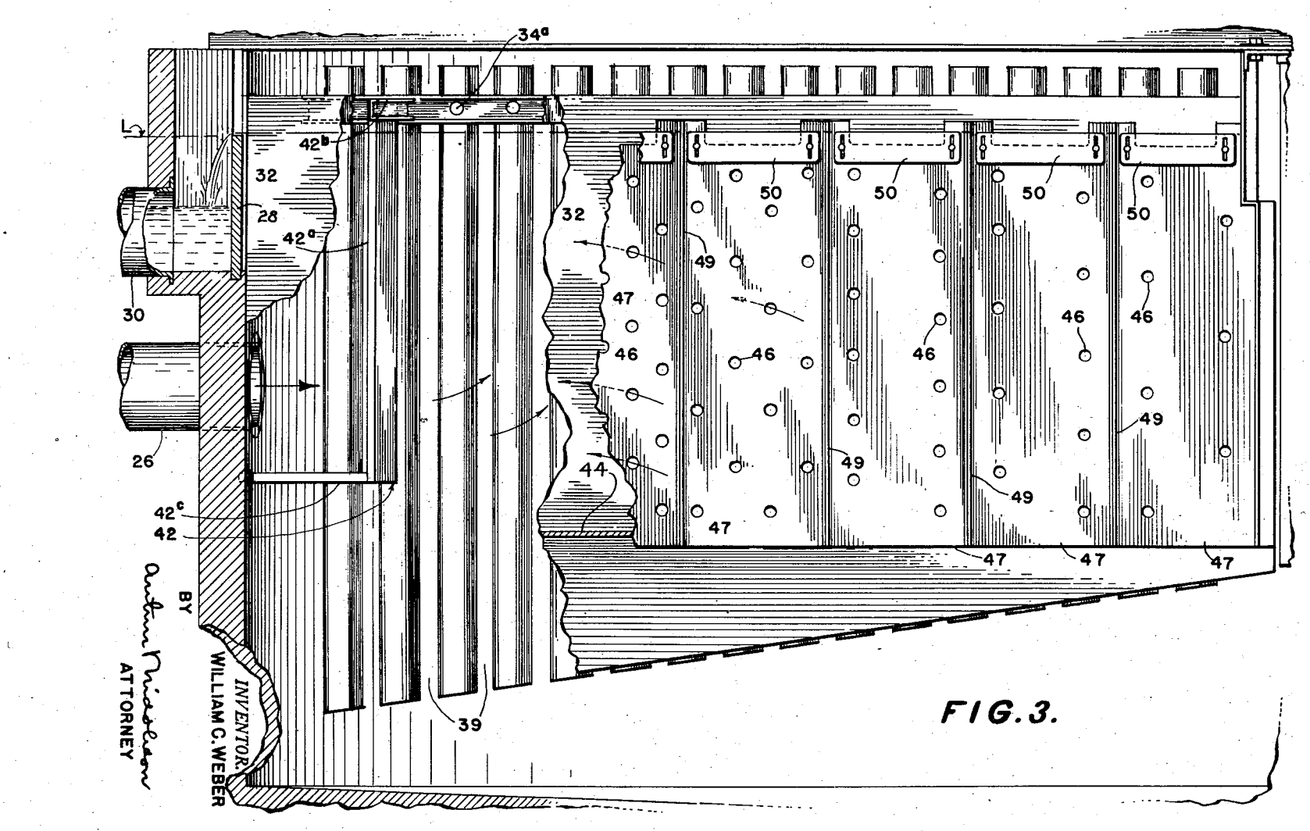
Fig. 3 is a view along the line 3—3 in Fig. 2.

The unitary sector-like structure 22 may be viewed as a substantially radially extending immersed structure of which the narrow end approaches or is disposed near the vertically-extending portion of the tank. The marginal wall 12 of the tank is shown as circular or round in plan but it should be noted that the inwardly and substantially radially extending sector-like or triangular structure 22 may be advantageously employed to realize the novel functioning thereof in a tank of which the marginal wall in plan is in the form of an equi-lateral, equi-angular polygon, for example, the form of a square or of a hexagon or an octagon or the like.

The unitary sector-like structure 22 comprises an end plate 31 closing the inner or narrow end of the structure and a central partition wall 32 separating the tapering influent channel 25 from the tapering effluent channel 27. The feed emitting side of the feed channel 25 is designated by the numeral 33 and is in effect represented by a row of vertical feed baffles 34 having their upper ends fastened as at 34ᵃ to a beam member 35 forming part of the sector-like structure 22, the opposite or lower end portions of the baffles 34 extending freely down into the body of liquid in the tank. The feed baffles 34 are U-shaped in cross-section, the U-shape comprising rounded corner portions 36ᵃ and 36ᵇ respectively and a long shank 37 and a shorter shank 38. The feed baffles 34 are spaced from each other so as to form between them vertically-extending slots providing feed inlet passages 39. The rounded corners on the baffles 34 are to prevent coarse matter or trash that might be present in the feed from getting caught on and eventually clogging up the feed passages.

Figs. 4 to 8 representing various cross-sections of the sector-like structure 21, show that the tapering feed channel 25 comprises a bottom portion 40 sloping downwardly towards the lower end portions of the feed baffles 34 and shown to terminate just short thereof so that the bottom 40 forms with the lower ends of the feed baffles 34 a downward passage 41 through which solids or material settling in the feed channel 25 may gravitate downwardly on to the bottom 11 of the tank, where it may be reached by the rotary raking arms and disposed along with the other sediment on the tank bottom.

Figure 4:
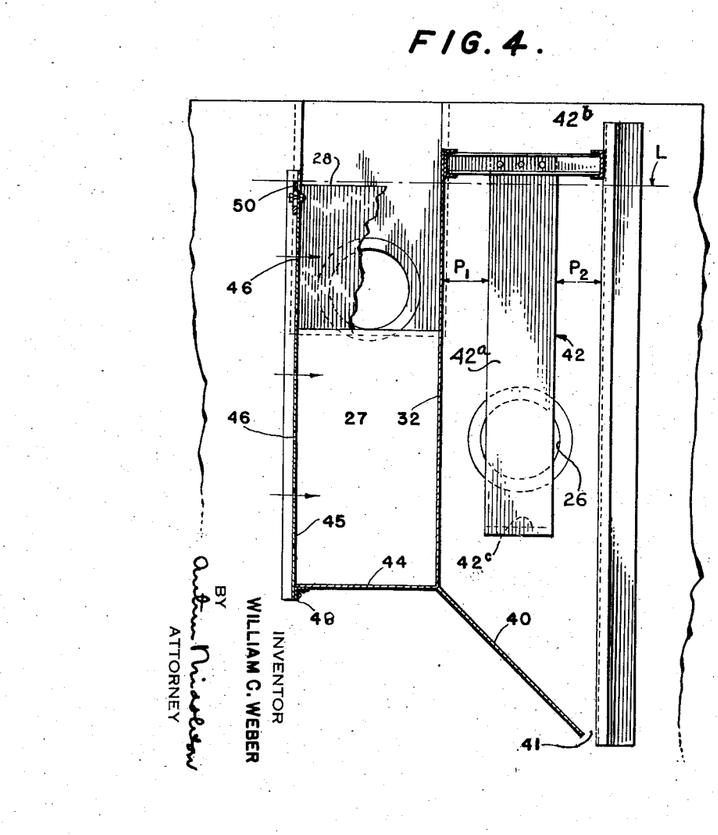
Fig. 4 is a section taken upon the line 4—4 in Fig. 2.
Figure 5:
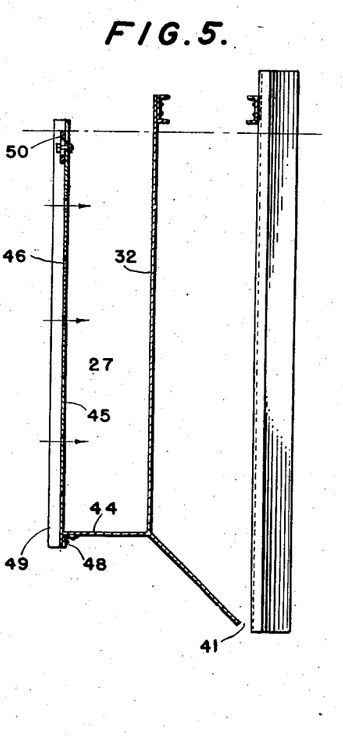
Fig. 5 is a section taken upon the line 5—5 in Fig. 2.
Figure 6:
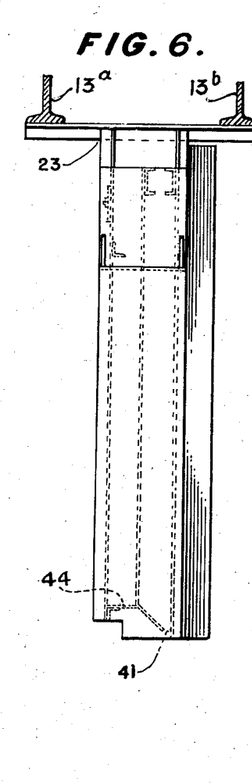
Fig. 6 is a section taken upon the line 6—6 in Fig. 2.
Figure 7:
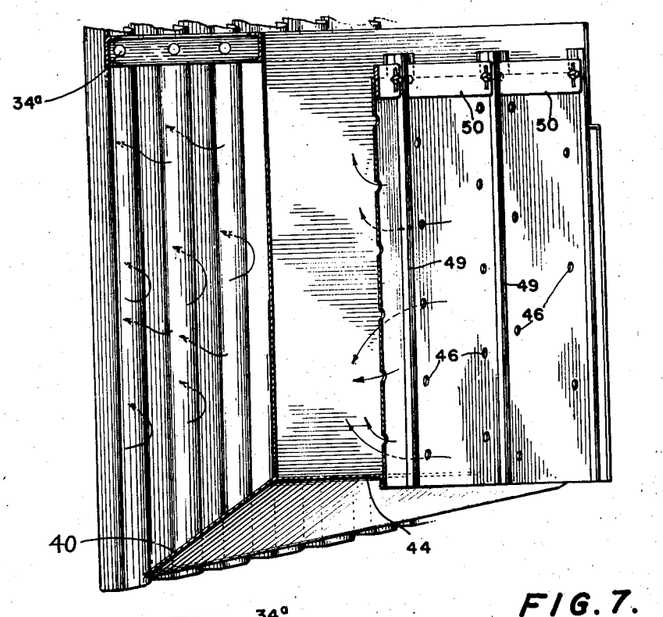
Fig. 7 is a section taken upon the line 7—7 in Fig. 2.
Figure 8:
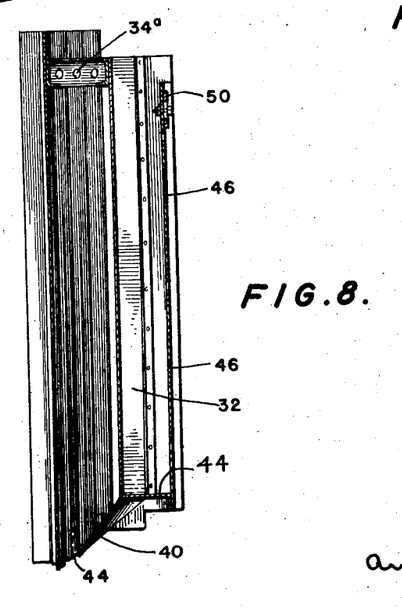
Fig. 8 is a section taken upon the line 8—8 in Fig. 2.

The feed inlet connection or pipe 26 is shown in this embodiment to be located a substantial distance below the liquid level "L" in the tank, and it has associated therewith a baffle member 42 comprising a vertical portion 42ᵃ having its upper end fixed to a cross member 42ᵇ which interconnects the sides of feed channel 25, the vertical baffle portion 42ᵃ thus being disposed squarely in the path of the incoming liquid and providing at each side a feed passage P₁ and P₂ respectively (see Fig. 4).

The baffle member 42 further comprises a horizontal portion 42ᶜ extending from the lower end of the vertical portion 42ᵃ to the tank wall 12 in which it is anchored.

The effluent receiving channel 27 has a flat bottom 44 and an effluent receiving side wall 45 provided with submerged effluent receiving passages or holes 46, the number of holes per unit area being less numerous near the center of the tank and being most numerous near the tank wall. The number of holes from its minimum to its maximum per unit area is so graded as to effect a rate of effluent withdrawal through the side wall 45 that is approximately in proportion to the distance from the center of the tank. In this way a high volumetric efficiency of the tank volume is to be attained.

The side wall 45 of the effluent channel 27 is composed of a series of panels 47 fastened to the bottom as by angles 48 and connected with one another as by flanges 49. It will be noted that the panels 47 counting from the center of the tank outwardly, are provided with consecutively increased numbers of effluent passages or holes 46. Each panel 47 furthermore is shown to be provided with an adjustable overflow edge member 50 whereby additional flow volume may be disposed of in a controlled manner. That is to say, each overflow member 50 may be given individual adjustment so as to control the flow volume passing over it substantially in proportion to respective radii, that is in proportion to the mean distance of each member 50 from the center of the tank. According to this control feature, the overflow edges of the adjustable members 50 will be somewhat below the liquid level L as defined by the main overflow weir 28, while the respective adjusted levels of the overflow members 50 will differ from each other in the sense that, counting from the center of the tank outwardly, each member 50 will be adjusted slightly lower than the preceding ones.

In the foregoing there has been described a sedimentation unit embodying this invention, which lends itself more particularly to the clarification of liquids carrying relatively light suspended even though settleable solids, and it has been noted that the volumetric efficiency of the tank in that instance is enhanced by the introduction of the feed liquid simultaneously over a considerable depth of the tank, but also by an effluent withdrawal in depth as shown by the provision of suitably distributed through flow- and overflow passages at the effluent receiving side of the effluent channel 27.

Figure 9:
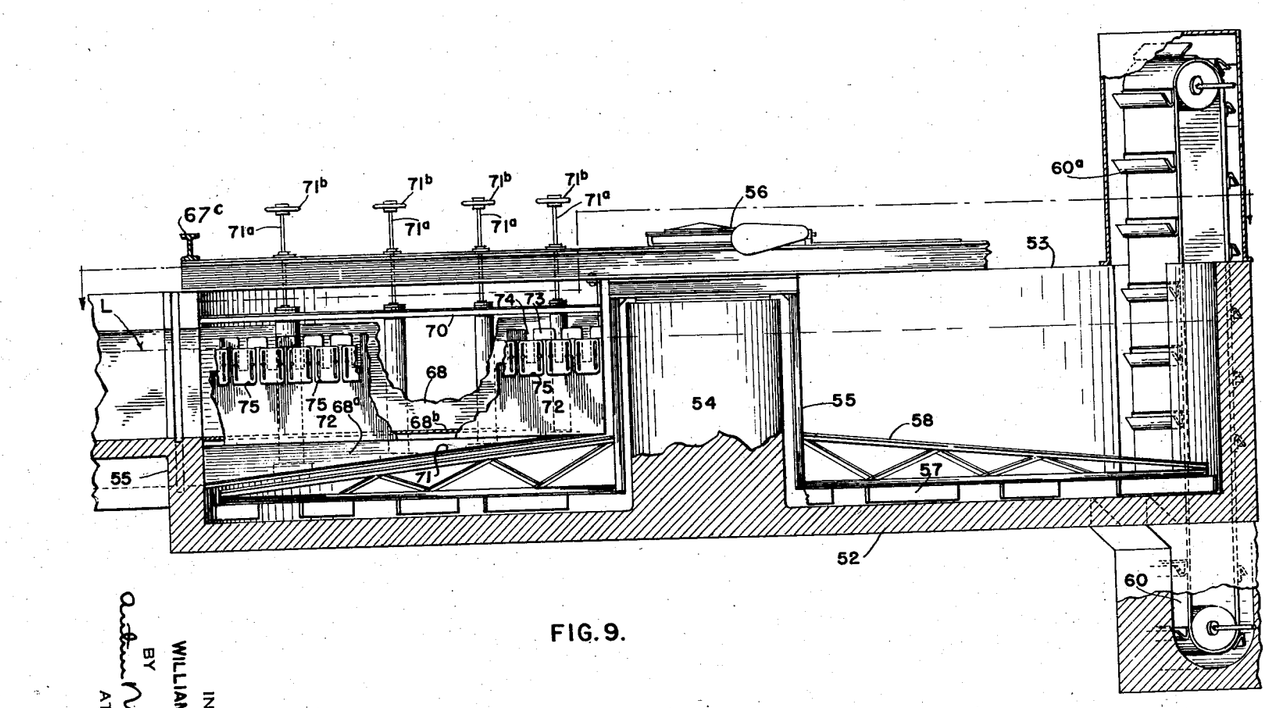
Fig. 9 is an elevational section of a round settling tank embodying a modified form of the invention.
Figure 10:
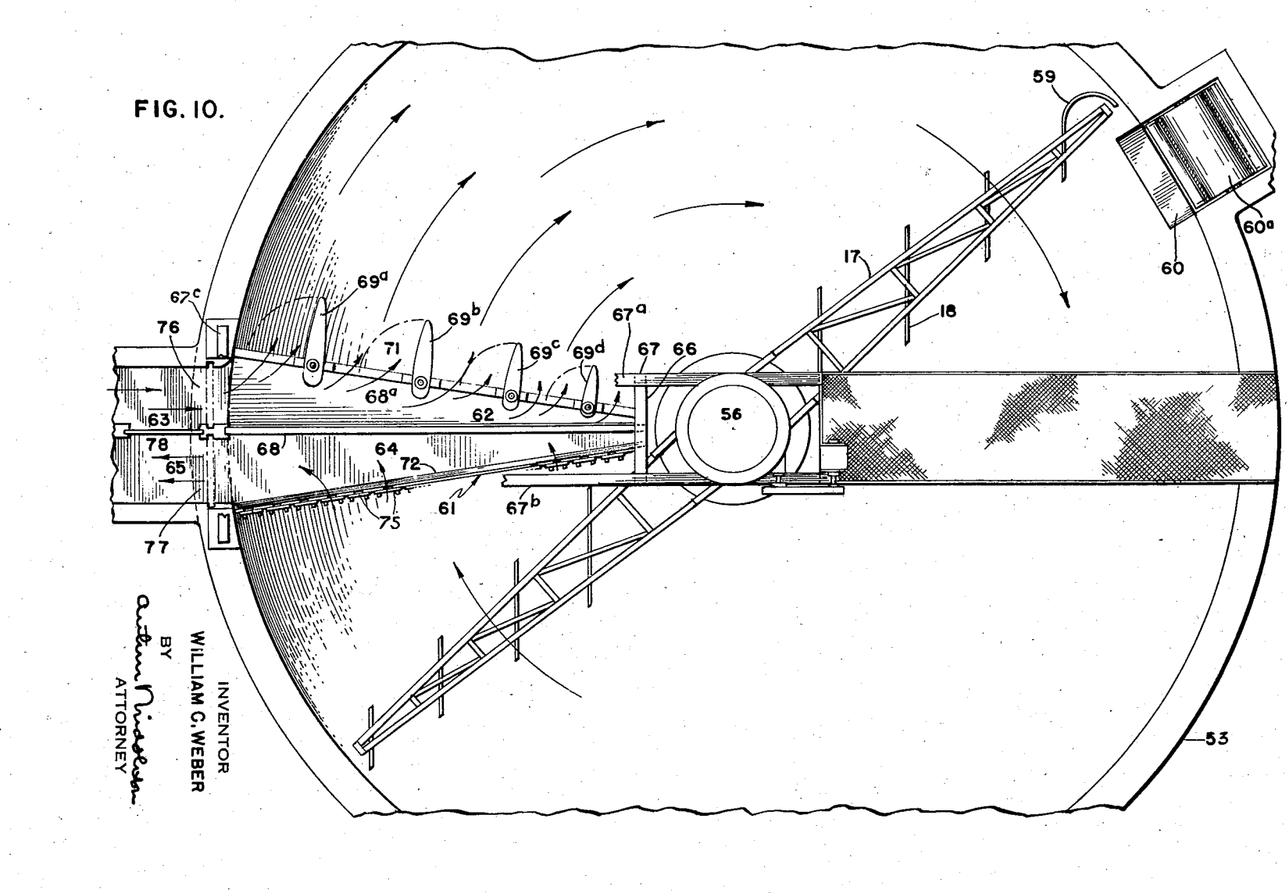
Fig. 10 is a plan view of the tank shown in Fig. 9.

The invention will now be described in the embodiment of Figs. 9 and 10 showing a sedimentation unit more specifically adapted for the handling of liquids bearing solids of a relatively greater settling rate. Such liquids are grit bearing liquids, for instance raw sewage carrying a mixture of the relatively heavy and fast settling grit and of slower settling other matter such as the organics.

In sewage treatment practice the grit or detritus per se is substantially removed by settling in a special tank, the so-called grit chamber, the effluent from which may be further treated to remove the lighter solids and organic matter which have remained in suspension in the effluent. The settled grit collected at a point of discharge in the tank is raked up or elevated from submergence and may be separately treated, washed or scrubbed, in order to separate organic matter adhering to or enveloping the grit particles, and the thus separated organic matter may be returned to the bulk of the effluent or to the body of sewage in the grit chamber eventually to leave the same in the effluent.

Thus the embodiment in Figs. 9 and 10 represents a sedimentation unit capable of serving as a grit chamber. In view of that purpose, a round tank having a bottom 52 and a wall 53 is provided with a pier supported rotary raking apparatus, that is a central pier 54, a rotary raking structure 55 and drive mechanism 56 supported on the pier. The raking blades 57 on rake arms 58 of the raking structure are disposed and effective to convey settled solids or grit over the tank bottom outwardly, that is into an outlying zone close to the tank wall, where a scoop-shaped element or blade 59 provided upon the extreme outer end of a rake arm 58 conveys it along the tank wall to and into a depression or sump 60 provided at the tank wall, whence the collected grit is lifted out of submergence, that is to a point of delivery above the tank, by suitable elevating means here shown in the form of an endless scoop conveyor 60$^a$.

In this embodiment (Figs. 9 and 10) the structure for feeding liquid into, and withdrawing effluent from the tank is a sector-like unit or structure 61 placed radially in the tank and fundamentally similar to that provided in the embodiment of Figs. 1 to 8, except for certain differences in the construction of the feed emitting side and the effluent receiving side of the structure.

This structure 61 comprises a feed inlet section 62 receiving feed liquid at its outer end from a feed channel 63, and an effluent receiving section 64 from the outer end of which effluent liquid discharges into an effluent channel 65. The narrow or inner closed end of the sector-like structure is supported by way of a cross member 66 from a beam construction 67, that is a pair of parallel beams 67$^a$ and 67$^b$, which beams traverse the tank diametrically and are supported upon the tank wall directly at one end, and through a transverse beam member 67$^c$ at the opposite end, the member 67$^c$ in turn being suitably supported upon the wall.

The feed section 62 and the effluent receiving section 64 of the structure 61 are separated from each other by a common wall or partition 68. The bottom of the structure 61 is considered to be similar to that of the embodiment shown in Fig. 4, in that the bottom portion 68$^a$ of the feed inlet section slopes downwardly towards the feed emitting side thereof, while the bottom portion 68$^b$ of the effluent receiving section is flat. The feed emitting side of the structure 61 is provided with a row of vertical feed directing vanes 69$^a$, 69$^b$, 69$^c$ and 69$^d$ which are streamlined in cross-section and rotatably adjustable about vertical axes.

These vanes are mounted at the top in a horizontal beam member 70 and at the bottom in an inclined beam member 71 the slope of which is downward towards the tank wall, following the slope of the upper chord of the truss member that is shown to constitute a rake arm 58. Consequently, the vanes 69$^a$, 69$^b$, etc., are graded in height and width, the shortest and narrowest one being near the center of the tank, and the highest and widest one being near the tank wall. Each vane is shown to be adjustable by way of an upward vertical shaft extension 71$^a$ and a handwheel 71$^b$, from a platform provided on the beams 67$^a$ and 67$^b$.

The effluent receiving side of the effluent section 64 comprises a wall 72 having a castellated upper portion presenting lands 73 and dales 74. Otherwise expressed, the dales 74 are notch-like cutouts in the top portion of the wall 72, and they are partially blocked by adjustable overflow members 75 which in this embodiment determine the general liquid level in the tank. A desirable volumetric efficiency is obtained with respect to the flow cross-section of the liquid passing through the tank along a general circular path by variously adjusting the overflow members or plates 75. That is to say, from the center towards the tank wall, these plates may be adjusted with increasingly lower overflow levels, so that a relatively greater rate of overflow is effected at the outer zones than at the inner zones, the grading being in proportion to the respective distances of the annular zones of liquid from the center of the tank.

Closure plates or gates 76 and 77 shown in dot-and-dash may be provided for the feed inlet channel 62 and the effluent discharge channel 64 respectively, to shut the tank off the liquid inlet connection 63 and the outlet connections 65. In case the tank is thus shut off, a closure plate or gate 78 may be lifted so that feed liquid may be short-circuited from the inlet connection 63 into the effluent discharge connection 65.

Operation

The sedimentation unit according to the embodiment of Figs. 1 to 8 lends itself more particularly for use as a clarifier, that is for the clarification of solids-bearing liquids in which the suspended solids are relatively light and by comparison, less readily settleable than, for instance, gritty matter that is carried along into the settling tank, along with raw sewage or the like. The operation according to the embodiment in Figs. 1 to 8 is as follows:

Feed liquid bearing suspended and, as it were, substantially non-gritty matter, enters by way of the inlet connection 26 into the radially disposed feed channel or section 25. The momentum of the inflow is dispersed by the baffle construction provided by or comprising the vertically-extending horizontally-spaced baffles 34 U-shaped in horizontal cross-section. After passing said baffles the liquid flowing from the influent receiving channel 25 is laterally directed into the settling space proper of the tank. By reason of the arrangement of the vertical feed baffles 34 and the vertical feed inlet slots 39 formed by them, there is effected a substantially well distributed rate of flow not only horizontally along the radius of the tank, but also in depth, due to the vertical length of the slots extending downwardly as far as it is feasible without interfering with the rotating arms of the sediment raking structure 16, 17, 18.

The individual feed baffles 34 are formed with a special somewhat U-shaped profile (see Fig. 2) in which the round corners are provided to avoid the disadvantage of sharp edges upon which rags or similar coarse matter is liable to get caught, and whereby eventually the influent slots might get clogged. However, with the construction of the influent distributing means or vertical flow baffles shown, any matter that might not be able to pass through the slots, or any matter that might settle on the sloping bottom of the influent receiving section 25 before it has a chance to pass through the slots, will thus be allowed to gravitate towards and through the downward passage 41 between the baffles and the sloping bottom down on to the bottom 11 of the settling tank proper.

From the slots 39 of the influent receiving channel 25, and provided the tank is operated properly, the liquid bearing suspended solids flows through the tank along a substantially circular path, namely along a general path that is substantially parallel to the tank wall, until it reaches the effluent receiving channel 27. The effluent receiving side of this channel is specially constructed and in particular provided with specially arranged submerged effluent passages, in order to effect the withdrawal of the then clarified liquid simultaneously over a substantial depth of the tank, or otherwise expressed, to effect the withdrawal at the properly distributed rates over a substantial portion of the horizontal flow cross-section of the liquid passing thus through the tank.

This mode of effluent withdrawal is in distinction from any such arrangements that rely merely on effluent withdrawal by means of overflow weir. This depth withdrawal is effected in the present instance in that all or a portion of the effluent liquid is allowed to pass through the arrangement of submerged effluent passages or holes 46 in the effluent receiving side wall of the effluent channel 27, while any additional or excess liquid volume may at the same time be allowed to pass over the individually adjustable weir plates 50 of that side wall. The clarified liquid then leaves the tank across the effluent weir 28 provided at the outer end and transversely of the effluent receiving section 27, and is then discharged by way of the effluent connection 30. While the liquid is in transit through the tank in the manner just described, suspended matter from the liquid is allowed to settle to the tank bottom, and the sediment or sludge may be continuously collected due to the rotation of the rake arms 17 driven by the drive mechanism 14, and eventually passed to and into the central discharge 19 to be withdrawn through the sludge discharge pipe 20.

It will be understood that in this embodiment (Figs. 1 to 8) the feed induction as well as the effluent outlet means are designed to be effective over a considerable depth or a considerable portion of the total flow cross-section of the liquid passing horizontally through the tank even though along a generally circular path. It will furthermore be seen that in order to make proper use of the settling area, and for the sake of high volumetric efficiency of the tank, that the outer circular zones of the liquid body in transit should travel at a faster rate than the more inlying circular zones; in other words, that the rate of travel of the respective zones should be substantially in proportion to the respective length of their radii with respect to the center of the tank. Therefore the effluent withdrawal means, and in particular the submerged effluent passages 46 as well as the adjustable overflow weir plates 50, represent an effluent area so distributed as to aid in obtaining the aforementioned proportional flow rates of the concentric zones of the liquid body in transit through the tank.

According to the embodiment of a sedimentation unit as shown in Figs. 9 and 10, the radially disposed feed induction and effluent receiving construction is modified or more specifically adapted for the handling of liquids carrying relatively heavier, that is fast settling matter, for instance gritty matter such as is found to be carried along with other matter such as organic substances in raw sewage. If used for the purpose of separating the grit or so-called detritus from the sewage, the settling tank designed according to this embodiment (Figs. 9 and 10) may be termed as what is known in the sewage treatment art as a grit chamber.

Assuming the tank to be in the nature of a grit chamber, the operation is as follows:

Grit-bearing liquid or raw sewage from the influent channel 63 enters the radial influent section 62 for induction into the tank settling space proper. The inflow of the liquid is directed laterally off the influent section by means of the flow directing rotatably adjustable vertical influent vanes 69$^a$, 69$^b$, 69$^c$, 69$^d$. Consequently the liquid follows a horizontal progressive and generally circular flow path, that is a general flow path substantially parallel to the circular wall of the tank.

This kind of circular flow is aided by the properly graded adjustment of the overflow weir plates 75 which also control the general liquid level in the tank. By comparison of this embodiment (Figs. 9 and 10) with the first described embodiment (Figs. 1 to 8), it will be noted that in Fig. 9 there is provided a considerably larger number of weir plates than in the arrangement of Fig. 1. It will also be remembered that in the Fig. 1 embodiment the general liquid level in the tank is determined by the weir 28 and not by the radial weir plates 50, whereas in the Fig. 9 embodiment the relatively larger number of weir plates 75 permits a more finely graded adjustment of the flow rates, and also acts as the means for determining the general liquid level in the tank.

Consequently it will also be noted that the Fig. 9 embodiment shows no additional submerged effluent openings such as shown in the Fig. 1 embodiment, and consequently there is not effected effluent withdrawal in depth such as was found beneficial in the Fig. 1 embodiment for the purpose of treating liquid carrying the relatively lighter solids. In the present instance (Fig. 9 embodiment) it was found that because of the heavy or gritty character of the solids to be settled, the absence of the depth withdrawal did not otherwise reduce the volumetric efficiency of the tank, and that a desired efficiency could be attained by the proper operation of the adjustable weir plates 75 alone. In this embodiment (Fig. 9) only the feed induction means (note the vertical vanes 69$^a$ to 69$^d$) are shown to have depth effect. In this embodiment the settled matter or grit is collected by the raking blades 57 of the rotary structure 55 driven by the drive mechanism 56, in a progressively outward direction until it reaches the outer zone close to the tank wall where it is picked up by the scoop shaped blade 59 and eventually carried thereby to a marginal point of discharge in that it is dropped into the sump 60 whence it is elevated from the liquid to a point of emergence by the scoop conveyor 60 to be delivered for disposal, or for what is known as the grit washing treatment whereby the grit is scrubbed free of organic matter encasing the grit particles or mixed with them. In sewage treatment practice the thus washed off organic matter is returned to the body of the liquid in the tank so that it may be withdrawn along with the effluent therefrom.

The effluent itself carrying suspended organic matter may be further treated by sedimentation, filtration or digestion or by any suitable combination of such or similar steps as known in sewage treatment practice.

It is to be noted that the liquid body in the tank comprises a bottom strata or portion which is not a direct part of the liquid body in transit about the vertical axis of the tank from the radial inlet to the radial outlet in the process of sedimentation. This is the strata substantially defined by the depth or clearance between the lowest part of the radial feed channel and the tank bottom. As shown, this clearance affords passage therethrough of the rake arms 17. The rotation of the rake arms helps this bottom strata of liquid to rotate in repetitive cycles and thereby reduces the effect or reaction of bottom drag upon the overlying body of liquid that is in transit through the tank from the radial influent to the radial effluent channel.

Hence the repetitive rotation of the bottom strata thus established, results in a relative increase of the volumetric efficiency or sedimentation capacity of the tank. A favorable effect in this respect is obtainable by rotating the rake arms at a speed corresponding or substantially equal to the rate of progress of the overlying body of liquid which is in transit through the tank.

It is also noted that the rotation of the arms in the direction of the liquid in transit, and the concurrent repetitive rotation of the bottom strata of liquid, is conducive to prevent short circuiting of liquid from the influent channel to the effluent channel by way of the clearance underneath.

Furthermore, according to this invention, a novel phenomenon is that if the horizontal flow of liquid in the process of sedimentation is conducted along a horizontally curved path under certain controlled influent and effluent conditions, the volumetric efficiency of available tank volume is relatively improved.

This phenomenon is herein represented in the form of the merely annular body of liquid which is in transit from the radial influent to the radial effluent channel of a circular tank.

I claim:

1. A sedimentation tank comprising a tank bottom, a marginal wall extending around and a distance from a central portion of said tank whereby there is provided a holding space for a body of liquid within the tank, sediment discharge means leading from the lower portion of the tank, a feed receiving stationary channel extending between said wall to said central portion and having an influent portion at the wall, means for supplying liquid into said influent portion of the channel, immersed means for laterally distributing from said channel and submergedly delivering liquid into the tank, an effluent collecting outflow channel separated from and disposed to extend substantially along said feed channel for receiving effluent passing thereinto from the body of liquid within the tank, overflow means associated with the outflow channel for determining the operative level of the body of liquid in the tank, and means for discharging effluent liquid from said outflow channel.

2. A sedimentation tank according to claim 1, in which the immersed feeding means of the feed channel comprise a row of vertical feed baffle elements horizontally-spaced from one another so as to form vertically-extending slots providing feed inlet passages.

3. A sedimentation tank according to claim 1, in which the immersed feeding means of the feed channel comprise a row of vertical feed baffle elements of approximately U-shaped cross-section having rounded corners and disposed with the shanks of the U-shape pointing in the direction of flow of the feed liquid into the tank, said elements being spaced from one another so as to form vertically-extending slots serving as feed inlet passages.

4. A sedimentation tank according to claim 1, in which the feed channel has a bottom portion that slopes down towards the feed emitting side of the channel, and in which there is provided a downward passage at the lowest point of said bottom portion for the release therethrough into the tank of solids settling in the feed channel from the feed liquid.

5. A sedimentation tank according to claim 1, in which the feed-supplying means comprise a feed inlet connection penetrating the tank wall at the outer end of the feed channel intermediate the top and the bottom portion of the channel, with the addition of a vertical baffle element disposed in the feed channel and functionally associated with said inlet, which element is spaced from and faces the inlet, and is narrower than the feed channel so as to provide for a passage between each side of the feed channel and said element.

6. A sedimentation tank according to claim 1, in which the feed-supplying means comprise a feed inlet connection penetrating the tank wall at the outer end of the feed channel intermediate the top and the bottom portion of the channel, with the addition of a baffle element disposed in the feed channel and functionally associated with the feed inlet, said element comprising a vertical plate portion spaced from and facing said feed inlet and narrower than the feed channel so as to provide for a passage between each side of the feed channel and said element, and a horizontal plate portion extending from the lower end of said vertical plate portion to the tank wall.

7. A sedimentation tank according to claim 1, in which the immersed feeding means of the channel comprise a row of vertical vanes each of which is rotatably adjustable about a vertical axis.

8. A sedimentation tank according to claim 1, in which said overflow means comprise adjustable weir portions disposed along the effluent receiving side of the effluent channel.

9. A sedimentation tank according to claim 1, in which said overflow means comprise a weir at the outer end of the effluent channel, with the addition that submerged effluent receiving passages are provided in the receiving side of the effluent channel, which passages are disposed in a manner whereby there is effected withdrawal of effluent liquid substantially throughout the flow cross-section of the liquid passing through the tank.

10. A sedimentation tank according to claim 1, in which said overflow means comprise a weir at the outer end of the effluent channel, with the addition that submerged effluent receiving passages are provided in the receiving side of the effluent channel, which passages are disposed in a manner whereby there is effected withdrawal of effluent liquid substantially throughout the flow cross-section of the liquid passing through the tank, and that adjustable overflow portions are provided along the effluent receiving side of the effluent channel.

11. A sedimentation tank according to claim 1, in which said feed and said effluent channels are embodied in a unitary structure mounted in said tank and having a partitional wall dividing the feed channel from the effluent channel.

12. A sedimentation tank according to claim 1, in which said feed and said effluent channels are embodied in a unitary structure having a partitional wall dividing the feed channel from the effluent channel, and in which the bottom portion of that structure comprises a horizontal bottom portion for the effluent channel and a downwardly sloping bottom portion for the influent channel.

13. A sedimentation tank according to claim 1, in which said feed and said effluent channels are embodied in a unitary structure having a partitional wall dividing the feed channel from the effluent channel, and in which the feed emitting side of the feed channel comprises a horizontally extending top beam element, and a row of vertical feed baffle members fastened at their upper ends to said beam element and extending down for a substantial length into the tank, and in which the bottom of the influent channel slopes down towards and terminates short of the lower end portions of said vertical baffle members, to provide a free downward passage for solids settling in the influent channel from the feed liquid.

14. In a liquid holding sedimentation tank having a bottom and a wall extending around and a distance from the central portion of the tank, the combination which comprises an influent distributing structure having a row of fixed vertical elements having upper end portions adapted to be emerged from the liquid and extending through a substantial portion of the depth of the tank and are spaced from one another so as to provide corresponding vertical slots as submerged influent passages for depth distribution of the liquid, an effluent collecting structure having submerged effluent passages disposed to effect a substantially even rate of effluent withdrawal over a flow cross-section corresponding substantially to that of the influent distributing structure and also having adjustable weir means over which may flow a potential excess of effluent, said effluent collecting structure comprising an effluent channel extending along said influent distributing structure for receiving the effluent.

15. In a sedimentation tank having an influent end and functionally horizontally spaced therefrom an effluent end, an influent distributing structure comprising a row of fixed vertical baffle members having emerged upper end portions and the opposite ends of which terminate a distance above the tank bottom, which baffle members are horizontally spaced from one another and thereby providing vertical influent slots constituting submerged influent passages for depth distribution of the influent liquid, a feed chamber extending along said row of baffle members for conducting the influent liquid to said vertical slots, said chamber comprising a bottom portion sloping downwardly towards the lower ends of said vertical members and terminating a distance short thereof and thereby providing between the lower end portion of the bottom and the lower end portions of said vertical members a downward passage for the release therethrough on to the tank bottom of solids retained or settling in said feed channel, and means for passing settled solids from within the tank.

16. In a sedimentation tank having an influent end and functionally horizontally spaced therefrom an effluent end, an influent distributing structure comprising a row of fixed vertical baffle members horizontally spaced from one another and thereby providing vertical influent slots, said vertical members having a cross-section the outer contour of which is defined approximately as a U-shape having rounded corners and disposed with the shanks pointing in the direction of the flow of the liquid into the tank, the one shank of said U-shape being substantially longer than the other shank, a feed chamber extending along said row of baffle members for conducting the influent liquid to said vertical slots, the direction of flow of liquid through the chamber being such as to face the longer shanks of said U-shape, and means for passing sedimented material from the tank.

17. In a liquid holding sedimentation tank having a bottom and a wall extending around and a distance from the central portion of the tank, the combination of structure comprising a feed receiving channel extending between the wall and said central portion of the tank, having immersed means for laterally feeding therefrom into the tank, and an effluent collecting outflow channel extending along the influent channel.

18. In a sedimentation tank having a wall extending around and a distance from the central portion of the tank, an influent distributing and effluent collecting structure extending between the wall and the central portion of the tank and comprising a feed receiving and distributing channel substantially sector shaped in plan and having its wide end portion disposed at the wall and its narrow end portion at the central portion of the tank, and having immersed means at one side for laterally feeding therefrom into the tank, an effluent collecting outflow channel substantially also sector shaped, extending along the influent channel and structurally unitary therewith, said effluent channel having liquid passage means for receiving effluent liquid at the side which is opposite to the feed emitting side of the feed channel.

19. A sedimentation tank according to claim 1, in which the immersed liquid delivery means of the feed channel comprise a row of vertical feed baffle elements having free lower end portions and horizontally spaced from one another so as to form vertically extending feed inlet slots.

20. A sedimentation tank according to claim 1, in which both said channels are spaced from the bottom of the tank, with the addition of a sediment engaging and conveying structure rotatable about a vertical axis in the central portion of the tank and having sediment engaging arms moving over the bottom and through the space between the tank bottom and said channels.

WILLIAM C. WEBER.